Dec. 20, 1960 R. R. BETTIN ET AL 2,965,857
REGULATOR FOR CARRIER SIGNAL INSERTION CIRCUIT
Filed Nov. 25, 1959
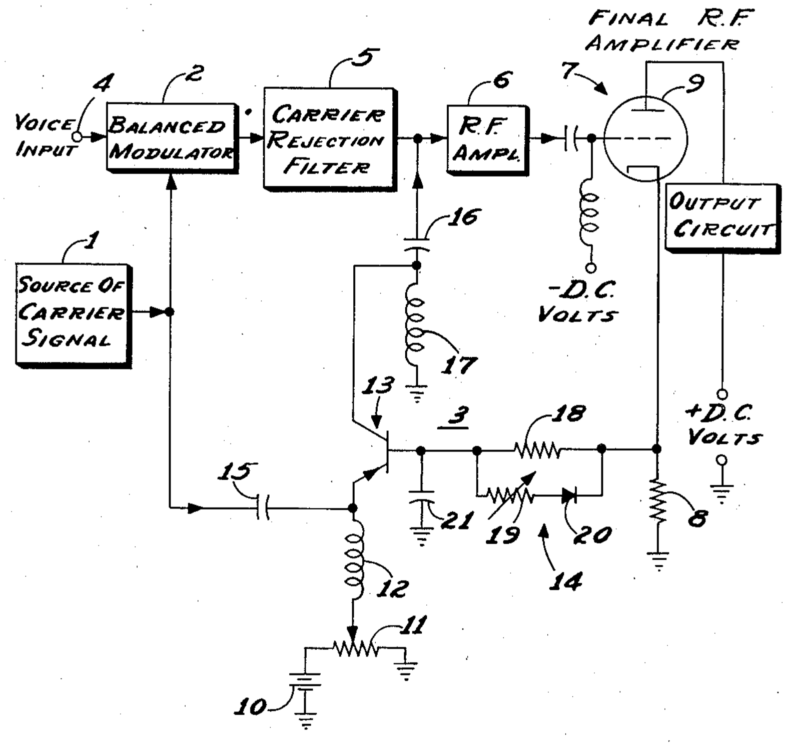
INVENTORS
ROGER R. BETTIN
WILLIAM E. HERZOG
BY Marvin Moody
ATTORNEY
Glenn H. Antrim
AGENT United States Patent Office 2,965,857

Patented Dec. 20, 1960

2,965,857

REGULATOR FOR CARRIER SIGNAL INSERTION CIRCUIT

Roger R. Bettin, Webster, N.Y., and William E. Herzog, Cedar Rapids, Iowa, assignors to Collins Radio Company, Cedar Rapids, Iowa, a corporation of Iowa Filed Nov. 25, 1959, Ser. No. 855,314

3 Claims. (Cl. 332—38)

This invention pertains to radio-frequency carrier-injection circuits for suppressed-carrier radio transmitting equipments and particularly to circuits for automatically maintaining the amplitude of inserted carrier at substantially a predetermined level regardless of the degree of modulation of output signal.

A suppressed-carrier radio transmitting system may conventionally include a balanced modulator to which a modulating signal and a carrier signal are applied. Much of the energy at the frequency of the carrier is balanced out within the modulator so that the energy in the output signal is mostly contained within the upper and lower sidebands. The output from a modulator may be passed through a narrow bandpass or carrier-rejection filter for further attenuating the carrier and also, in certain systems, one of the sidebands.

At times radio transmitting equipment of this type is used for transmitting a signal which includes a reinserted carrier signal of controlled amplitude. A carrier-insertion or bypass circuit with controlled attenuation may be connected from the source of the carrier signal in parallel with the balanced modulator and the carrier-rejection filter for reinserting carrier so that a carrier of desired level appears in the modulated output signal of the transmitting system.

The level of the carrier signal passed by the carrier bypass circuit of the instant invention is maintained quite constant regardless of normal variation in the degree of modulation of the output signal. This circuit includes a voltage comparison circuit, an attenuator system controlled by the comparison circuit, and a modulation compensation control circuit that is connected between the transmitter amplifier circuits and the comparison circuit and that operates in response to the application of variable modulated signals. A carrier-insertion circuit that includes a comparison circuit but does not include the compensation control circuit of this invention would reduce the carrier below a desired level during periods when the modulating signal is applied.

An object of this invention is to provide a carrier-insertion circuit of single design that automatically reinserts carrier signal at a level determined by the comparison circuit.

A further object of this invention is to provide in the automatic carrier-insertion circuit a compensating control circuit for preventing excessive reduction in carrier level when the modulator signal varies widely in amplitude.

The following description and the appended claims may be more readily understood with reference to the accompanying single drawing which shows schematically a carrier-insertion circuit of this invention connected to a conventional suppressed-carrier transmitting system in block form.

The generator of carrier signal 1 is applied to one input of balanced modulator 2 and to the input of carrier-insertion circuit 3. A source of modulating signal is connected to the other input 4 of balanced modulator 2 and is mixed with the carrier signal in the modulator to provide an output consisting of a double sideband suppressed-carrier signal. Since the carrier in the output has not been suppressed to the degree desired for certain types of transmission, the output signal from the balanced modulator is passed through a carrier-rejection filter 5 for further attenuating the carrier and perhaps one of the sidebands. The output circuits of carrier-rejection filter 5 and of carrier-insertion circuit 3 are applied through radio-frequency amplifier stages 6 to the final radio-frequency amplifier stage 7 that includes electron tube 9. The resistor 8 that is connected between ground and the cathode of tube 9 provides a load resistance across which is developed a unidirectional voltage which is proportional to the envelope of the incoming modulating signal.

The automatically controlled carrier-insertion circuit compares the positive voltage that is developed across resistor 8 with a positive constant reference voltage that a derived from an adjustable direct-current source that includes the source of voltage 10 and potentiometer 11. The arm of potentiometer 11 is connected through radio-frequency choke 12 to the emitter of the type PNP transistor 13. The cathode of the final radio-frequency amplifier tube 9 is connected through carrier compensation circuit 14 to the base of transistor 13. The circuit for reinserting carrier signal comprises a source of carrier signal 1, coupling capacitor 15, the emitter-to-collector circuit of transistor 13, and the capacitor 16 which is connected to the input of radio-frequency amplifier stages 6.

During its state of maximum conductivity, transistor 13 in the carrier-insertion circuit passes inserted carrier of greater amplitude than is required to simulate an amplitude-modulated signal with 100% modulation. When potentiometer 11 has been adjusted to maintain the inserted carrier at a desired amplitude, the impedance of the emitter-to-collector circuit of transistor 13 increases as the voltage developed across resistor 18 approaches the value of the preset direct-current voltage so that the carrier signal is attenuated as required for maintaining the carrier at a predetermined constant level.

For example, when the modulating signal is relatively constant and the arm of potentiometer 11 is set for a reference voltage of five volts, a stable condition may exist when the direct-current voltage as derived from the modulated signal applied to the base of transistor 13 is 4.9 volts.

When the modulating signal is a voice signal, or any other signal that is variable, the average direct-current voltage developed across resistor 8 tends to become greater than that required for maintaining the amplitude of the injected carrier signal constant and thereby increases the voltage that is applied to the base of transitor 13. In order to maintain the applied voltage constant so that the carrier signal applied to the radio-frequency amplifier circuits remains constant, operation of the carrier control compensation circuit 14 is required.

The compensation circuit comprises resistor 18 that is connected between the cathode of electron tube 9 and the base of transistor 11, variable resistor 19 and diode rectifier 20 that are connected in series across resistor 18, and filter or storage capacitor 21 that is connected between the base of transistor 13 and ground. Diode 20 has been connected in the proper sense for partially discharging capacitor 21 during the intervals that the modulating signal has amplitudes smaller than the average amplitude.

During the intervals of minimum voltage between peaks of a highly modulated signal, the instantaneous voltages on the cathode of electron tube 9 are less than the direct-current voltage across capacitor 21. Therefore, current flows from the capacitor through variable resistor 19, diode rectifier 20, and resistor 8 to ground. The periods of discharging current compensate for the additional charging current caused by higher voltages across resistor 8. Therefore, the amplitude of the inserted carrier signal that is applied to the radio-frequency amplifier stages remains quite constant in spite of increasing voltage across resistor 8 during periods of higher modulation. When the transmitter is being operated to send continuous-wave signals, the carrier-insertion circuit operates effectively for controlling the amplitude of the carrier signal.

Although this invention has been described with reference to a particular embodiment thereof, the control circuit may be changed in ways obvious to those skilled in the art and still be within the scope and the spirit of the following claims.

What is claimed is:

1. In a radio transmitting system having a source of modulation signal, a source of carrier signal, a radio-frequency amplifier, and a suppressed-carrier modulator having one input connected to said source of modulating signal, another input connected to said source of carrier signal, and an output connected to the input of said radio-frequency amplifier; a carrier-insertion circuit including an electron control device and a modulation compensation circuit, said electron control device having a control electrode, an input electrode coupled to said source of carrier signal, and an output electrode coupled to the input of said radio-frequency amplifier, said modulation compensation circuit including a capacitor and a charging circuit, said capacitor being connected to said control electrode so that an increasing charge on said capacitor increases the impedance between said input and output electrodes in said carrier-insertion circuit, said charging circuit including a series resistor and a unidirectional diode connected between said amplifier and said capacitor for charging said capacitor during periods of low modulation of signal in said amplifier to a control voltage proportional to the average voltage of the signal therein, said charging circuit becoming non-linear in response to the application of high-modulated signal so as to provide greater impedance to charging current for said capacitor than to discharging current so that the rise in control voltage across said capacitor is proportionally less than the rise in the degree of modulation.

2. In a radio transmitting system having a source of modulation signal, a source of carrier signal, a radio-frequency amplifier, and a suppressed-carrier modulator having one input connected to said source of modulating signal, another input connected to said source of carrier signal, and an output connected to the input of said radio-frequency amplifier; a compensated automatic carrier-insertion circuit comprising a transistor having an input electrode, an output electrode, and a control electrode, said source of carrier signal being coupled through the input-to-output electrode circuit of said transistor to the input of said radio-frequency amplifier for inserting carrier, a capacitor connected to said control electrode, a charging network coupling said capacitor to the output of said amplifier, said network including a serially connected resistor and diode connected between said capacitor and said amplifier, said transistor responsive to an increasing charge on said capacitor for increasing the impedance between said input and output electrodes to reduce the amplitude of inserted carrier signal, said charging network operating in response to application of signal of low modulation from said amplifier for charging said capacitor to a voltage that is proportional to an average voltage of the applied modulated signal, and said diode in response to the application of signals of high modulation to said network having higher conductivity for current flow in the direction for discharging said capacitor than for current flow in the direction for charging said capacitor so that the rise in voltage across said capacitor for reducing the amplitude of inserted carrier is proportionally less than the rise in the degree of modulation.

3. In a radio transmitting system having a source of modulation signal, a source of carrier signal, a radio-frequency amplifier, and a suppressed-carrier modulator having one input connected to said source of modulating signal, another input connected to said source of carrier signal, and an output connected to the input of said radio-frequency amplifier, said amplifier having an electron tube with at least a control grid to which the modulating signal is applied, a plate to which an output circuit is connected, and a cathode connected to a cathode load circuit; an automatically controlled carrier-insertion circuit having a transistor, a capacitor, a charging network for said capacitor, said transistor having an emitter, a base, and a collector, said emitter being coupled to said source of modulating signal and said collector being coupled to the input of said amplifier to provide a carrier-insertion circuit, a source of bias voltage, said capacitor and said source of bias voltage being connected in series between said base and said emitter, said charging network including a resistor and a diode connected in series between said cathode and said capacitor, said transistor responding to an increasing charge on said capacitor for reducing the conductivity between said emitter and said collector and thereby decreasing the amplitude of the carrier signal which is applied to said amplifier, said network operating linearly in response to the application of signal of low modulation from said amplifier to charge said capacitor to a control voltage that is proportional to the average voltage of the applied signal, said diode during periods of high modulation having higher conductivity for current flow in the direction for discharging said capacitor than for current flow in the direction for charging said capacitor so that the rise in control voltage across said capacitor is proportionally less than the rise in the degree of modulation.

No references cited.